Jan. 21, 1930. C. L. GANNAWAY 1,744,305

NOZZLE FOR GREASE GUNS

Filed Feb. 3, 1928

INVENTOR.
Charles L. Gannaway,
BY
ATTORNEY.

Patented Jan. 21, 1930

1,744,305

UNITED STATES PATENT OFFICE

CHARLES L. GANNAWAY, OF NORTH CHATTANOOGA, TENNESSEE

NOZZLE FOR GREASE GUNS

Application filed February 3, 1928. Serial No. 251,633.

This invention relates to nozzles for grease guns and like high-pressure lubricating apparatus, and the main object of the invention is to provide a nozzle for grease guns or like devices by means of which lubricant under high pressure may be quickly and conveniently supplied to a part to be lubricated without loss of lubricant.

A further object of the invention is to provide a nozzle adapted for ready application to any conventional type of grease gun and which is designed for interlocking and sealing connection with a lubricant receiving fitting in a positive and secure manner so as to prevent accidental separation of the gun from the fitting or leakage during the grease supplying operation.

A still further object of the invention is to provide a nozzle which will make an automatic locking and sealing engagement with the fitting and which may be readily disconnected therefrom upon the conclusion of the lubricating action.

The invention consists of the features of construction, combination and arrangement of parts, hereinafter fully described and claimed, reference being had to the accompanying drawing, in which:—

Figure 1:
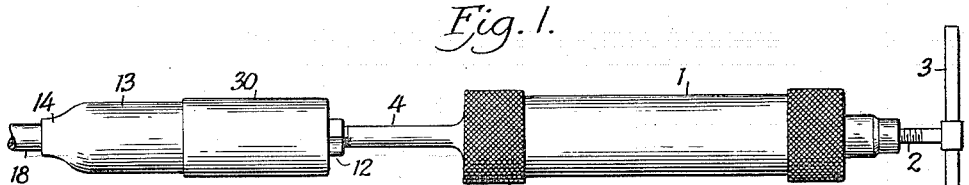
Figure 1 is a plan view of a grease gun provided with a nozzle and a fitting constructed in accordance with my invention.

Referring now more particularly to the drawing, 1 is the barrel of a grease gun, provided interiorly with an expressing plunger of any suitable character carried by the screw stem 2 operable by means of a handle 3 for feeding the plunger forward in the barrel to force grease therefrom, or to withdraw the plunger to permit the barrel to be refilled with grease. The barrel is provided at its forward end with a discharge tube 4 externally threaded at its outer end.

In carrying my invention into practice, I provide a nozzle adapted to be fitted upon the discharge tube 4. This nozzle comprises a body or discharge member 5 having a substantially cylindrical enlarged head portion 6 and a cylindrical relatively reduced stem portion 7, a shoulder 8 being formed at the intersection of said portions. The discharge member 5 has its head portion provided at its forward end with a fitting receiving recess 9 and in rear thereof said head portion is provided with a chamber 10, with which chamber communicates a lubricant feed bore 11 extending through the portion 7. The bore 11 is internally threaded at its rear end to receive the threaded end of the discharge tube 4 of the gun, whereby the nozzle is adapted to be fitted upon the gun, and a jamb nut 12 is provided upon the discharge tube 4 for engagement with the rear end of the stem 7 to hold the nozzle firmly in position and against casual displacement.

Enclosing the head portion 6 of the discharge member 5 is a casing sleeve 13 which is of somewhat larger diameter than said head portion except at its forward end, the forward end of the sleeve terminating in a cylindrical mouth portion 14 connected with the body of the sleeve by a flaring portion 15. The sleeve is secured in position upon the discharge member in any suitable manner. In the present instance it is shown as provided with internal screw threads 16 at its rear end to engage external threads 17 upon the rear end of the head 6, such construction providing a detachable connection between the sleeve and discharge member which permits of the ready and convenient initial assemblage of working parts and their disassemblage for cleaning, repairs or other purposes. The mouth portion 14 of the sleeve 13 is adapted to receive the body 18 of a lubricant fitting applied to a machinery part to be lubricated, said fitting having a projecting head 19 formed with a conical or hemispherical outer surface 20 and an undercut or shouldered rear surface 21, which head portion 19 is adapted to be received in the recess 9 of the discharge member when the nozzle is applied to the fitting for grease injecting purposes.

The head 6 is provided at diametrically opposite sides with longitudinally extending grooves 22 which open at the rear through its shouldered portion 8 and at the front communicate with slots 23 connecting said grooves with the recess 9. Preferably, as shown, the forward portion 24 of the head is conically reduced or tapered, and this tapered portion 24 lies opposite the tapered portion 15 of the sleeve 13, and the slots 23 extend through the tapered portion 24.

Figure 2:
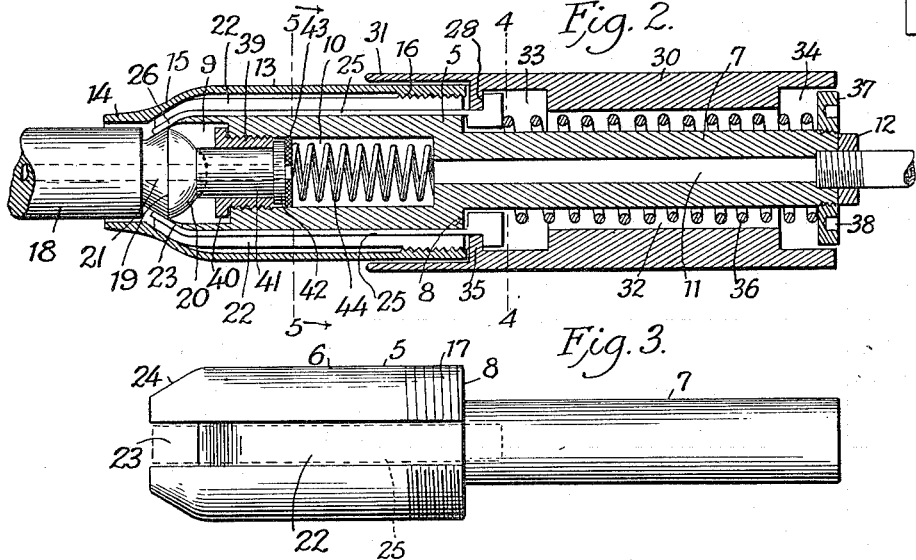
Figure 2 is a vertical longitudinal section on an enlarged scale through the nozzle and showing the same receiving and engaging the fitting.
Figure 3:
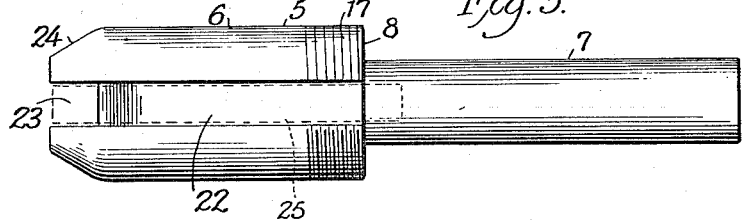
Figure 3 is a side elevation of the body member of the nozzle.
Figure 4:
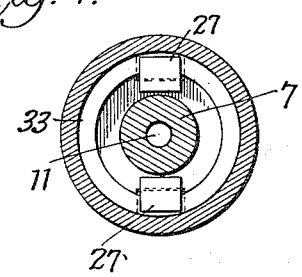
Figure 4 is a transverse section on line 4—4 of Figure 2.
Figure 5:
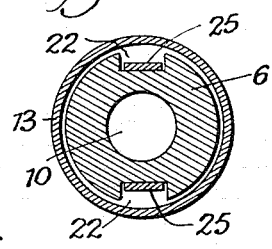
Figure 5 is a transverse section on line 5—5 of Figure 2.
Figure 6:
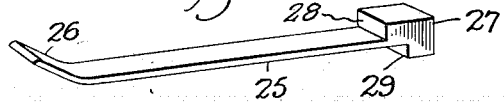
Figure 6 is a perspective view of one of the sliding locking bars.

The grooves 22 are closed by the casing 13 and receive longitudinally slidable resilient locking bars 25, each having at its forward end an angularly bent locking finger 26 and at its rear end a head portion 27 formed with a stop shoulder 28 and a stop shoulder 29. The bars 25 are movable forwardly and rearwardly in the grooves 22, and the fingers 26 are adapted to be normally held under tension by contact with the bottom walls of the groove and, upon a forward locking movement of the bars, to be projected by their resiliency through the slots 23 so as to engage the undercut or shouldered portion 21 of the fitting 19 to which the nozzle is applied, as shown in Figure 2, whereby to lock the nozzle to the fitting. The locking bars are adapted to be controlled and operated by a sliding sleeve 30 which encloses the stem 7 and has a reduced forward portion 31 lapping over upon and in guided connection with the rear portion of the sleeve 13. This sleeve 30 is provided with a central passage 32 communicating with front and rear recesses 33 and 34, the rear recess 34 opening through the rear end of the sleeve and the front recess 33 being arranged immediately in rear of the reduced extension 31, between which chamber and extension is formed an annular stop flange 35. This flange 35 engages the rear ends of the head 6 and sleeve 13 to limit the forward movement of the sleeve 30. As shown, the rear shouldered ends 27 of the locking bars 25 are enclosed in the chamber 33 of the sleeve 30 with their shoulders 29 in engagement with the flange 35, whereby said locking bars are coupled to the sleeve for movement therewith, the shoulders 28 of the locking bars being adapted for engagement with the shoulder 8 of the discharge device to limit the forward movement of the locking bars when said locking bars are in locking position. A coiled spring 36 is arranged in the passage 32 of the sleeve 30 about the stem 7 of the discharge device and extends at its ends into the chambers 33 and 34, the inner end of said spring being arranged to bear against the heads 27 of the locking bars and the outer end of the spring bearing against a nut 37 in threaded engagement with the rear end of the stem 7. The spring 36 operates by expansion to normally force the sleeve 30 forward and to also force the locking bars forward to locking position. The nut 37 not only serves as an abutment for one end of the spring 36, but as a means by which the tension of said spring may be varied. This nut is provided with recesses 38 of a type adapting it to be engaged and turned by means of a spanner wrench.

The outer end of the chamber 10 of the discharge device is internally threaded to receive a bushing 39 which is provided at its outer end with a flange 40 bearing against the inner end wall of the recess 9. Slidably fitted in this bushing is a tubular plunger tube 41 for making sealing contact between the nozzle and the fitting. This tube has a concaved outer end to snugly fit over the convex surface 20 of the nipple 18 and is provided at its inner end with a flange 42 which is movable in the chamber 10 and adapted to contact with the inner end of the bushing 39 to limit the outward movement of said plunger. A sealing washer 43 bears against the flanged end of the plunger tube, and between this washer and the inner end wall of the chamber 10 is arranged a coiled spring 44 adapted to permit the plunger to yield when the fitting is inserted and to force the plunger in contact with the fitting so as to make a grease tight connection between them when the nozzle and fitting are locked together. The washer 43 serves to seal the joint between the plunger and wall of the chamber 10 and to prevent any leakage of grease about the flange 42 and between the bushing and the plunger tube.

In the use of the device, the nozzle having been applied to the discharge tube 4 of the pump 1, the forward end of the nozzle is slipped over upon the fitting 18 so that the head of the fitting enters the recess 9 and bears against the outer end of the plunger tube 41. When the parts are thus brought into engagement the locking bars are held in retracted position by rearward movement of the sleeve 30. Upon bringing the nozzle into engagement with the fitting the sleeve 30 is released whereupon the spring 36 acts to force the sleeve and the locking bars forward, the fingers 26 of the locking bars passing through the slots 23 and engaging the shouldered surface 21 of the fitting head, whereby the nozzle is locked to the fitting and the fitting engaged in a grease tight manner with the plunger tube 41. The grease gun plunger is then operated to force grease through the discharge tube 4 and discharge device 5 and the plunger 41 and nipple 18 into the part to be lubricated, the tight locking connection between the plunger and fitting preventing any leakage of grease. As soon as sufficient lubrication has been discharged the sleeve 30 is drawn rearwardly so as to slidably retract the locking bars, whereby the nozzle is released from the fitting and may be disconnected therefrom.

It will be observed that the construction is such as to provide a nozzle which may be fitted upon any conventional type of grease gun or high pressure feed lubricating device for the purpose of connecting such gun or device with a fitting of the character described, and that such connection with the fitting may be easily and quickly made in such manner as to secure an automatic interlocking and sealing action, effectually serving to prevent any loss of lubricant by leakage during the operation of the gun. Also it will be seen that the invention provides a simple, reliable and efficient type of device for the purpose which may be quickly and conveniently released from the fitting, and that such device is composed of a comparatively small number of parts of a kind not liable to get out of order. The construction, is, furthermore, such that the device may be manufactured and sold at a comparatively low cost, and in use will prevent loss of lubricant by leakage and other difficulties attendant upon the use of guns having applicable discharge tubes and an ordinary bayonet joint connection with the fitting.

Having thus fully described my invention, I claim:—

1. A lubricating device comprising a gun, and a nozzle for connecting the gun to a fitting, said nozzle comprising a discharge member having a stem portion and a head portion provided respectfully with a lubricant passage and a fitting receiving recess, means in said passage for making sealing engagement with the fitting, a stationary sleeve enclosing the head portion of the discharge member, reciprocating locking devices slidable longitudinally of the nozzle between the same and the stationary sleeve and having fingers movable at an angle to their plane of sliding movement for engagement with and disengagement from said fitting, a spring about the stem portion of the discharge member for projecting the locking devices, and a sleeve enclosing said stem portion of the discharge member and the spring and operative for retracting the locking devices against the resistance of said spring.

2. In a lubricating device, a nozzle adapted to receive a fitting, a spring pressed plunger tube therein for sealing engagement with the fitting, locking bars slidable longitudinally of the nozzle and having fingers movable at an angle to their plane of sliding movement for engagement with and disengagement from the fitting, a spring for projecting the locking bars, and means for retracting the locking bars against the resistance of the spring.

3. In a lubricator, a discharge device having a recess to receive the head of a fitting, longitudinally extending guide grooves and slots connecting said grooves at their forward ends with said recess, a spring pressed plunger projecting into said recess to make sealing engagement with the head of the fitting, longitudinally slidable locking bars in said grooves having angularly bent locking fingers movable through said slots into and out of engagement with the head of the fitting, and means for projecting and retracting said bars.

4. In a lubricator, a discharge device having a recess to receive the head of a fitting, longitudinally extending guide grooves and slots connecting said grooves at their forward ends with said recess, a spring pressed plunger projecting into said recess to make sealing engagement with the head of the fitting, longitudinally slidable locking bars in said grooves having angularly bent locking fingers movable through said slots into and out of engagement with the head of the fitting, a spring for projecting said bars, and a sleeve slidable on the discharge device for retracting the bars.

5. In a lubricator, a discharge device having a recess to receive the head of a fitting, longitudinally extending guide grooves and slots connecting said grooves at their forward ends with said recess, a spring pressed plunger projecting into said recess to make sealing engagement with the head of the fitting, longitudinally slidable locking bars in said grooves having angularly bent locking fingers movable through said slots into and out of engagement with the head of the fitting, a casing enclosing the grooved portion of the discharge device and having at one end a mouth portion lying in advance of said recess and adapted to receive the body of the fitting, a spring for projecting the locking bars, and a sleeve slidably mounted on the discharge device in rear of said casing for retracting said locking bars.

6. In a lubricating device, a nozzle adapted to receive a fitting, a spring pressed plunger tube therein for sealing engagement with the fitting, locking bars slidable longitudinally of the nozzle and having fingers movable at an angle to their plane of sliding movement for engagement with and disengagement from the fitting, a spring for projecting the locking bars, an abutment for the spring adjustable for varying the working pressure of said spring, and a sliding sleeve for retracting the locking bars against the resistance of said spring and limited in its bar retracting movement by said abutment.

7. In a lubricating device, a discharge member having a head portion provided with a recess to receive the head of a fitting and a chamber and a stem portion provided with a bore communicating with said chamber, said head portion also having external longitudinal guide grooves and slots connecting said grooves at their forward ends with the recess, a spring pressed plunger mounted between the chamber and recess and adapted for sealing engagement with the head of the fitting, spring actuated locking bars slidably mounted in the grooves and having angularly bent fingers movable through the slots into and out of the recess for engagement with and disengagement from the fitting head, and means mounted on the discharge device for retracting the locking bars.

8. In a lubricating device, a discharge member having a head portion provided with a recess to receive the head of a fitting and a chamber and a stem portion provided with a bore communicating with said chamber, said head portion also having external longitudinal guide grooves and slots connecting said grooves at their forward ends with the recess, a spring pressed plunger mounted between the chamber and recess and adapted for sealing engagement with the head of the fitting, spring actuated locking bars slidably mounted in the grooves and having angularly bent fingers movable through the slots into and out of the recess for engagement with and disengagement from the fitting head, a cover enclosing the head portion of the discharge device, and a sliding sleeve enclosing the stem portion of the discharge device and operable for retracting the locking bars.

9. In a lubricating device, a discharge member having a head portion provided with a recess to receive the head of a fitting and a chamber and a stem portion provided with a bore communicating with said chamber, said head portion also having external longitudinal guide grooves and slots connecting said grooves at their forward ends with the recess, a spring pressed plunger mounted between the chamber and recess and adapted for sealing engagement with the head of the fitting, locking bars slidably fitted in the grooves and having shoulders at their rear ends and angularly bent locking fingers at their forward ends, said fingers being movable through the slots into and out of locking engagement with the fitting head in the recess, an abutment on the stem portion of the discharge device, a cover enclosing the head portion of the discharge device, a spring about the stem portion of the discharge device between the abutment and shoulders of the locking bars and operating to normally project said bars, and a sleeve enclosing the stem portion of the discharge device and said spring and having a flange engaging the shoulders of the locking bars whereby said bars may be retracted by sliding motion of said sleeve.

In testimony whereof I affix my signature.

CHARLES L. GANNAWAY.